Patented July 5, 1949

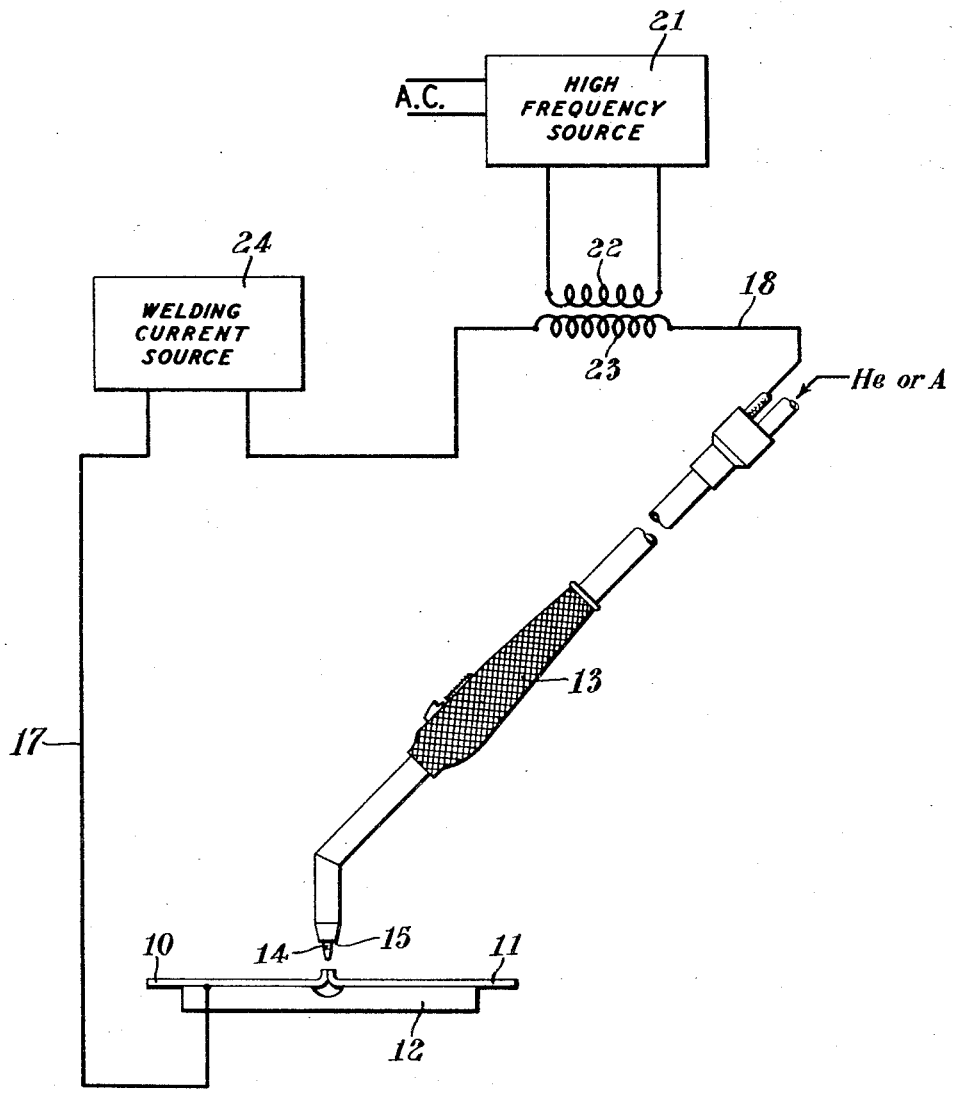

2,475,357

UNITED STATES PATENT OFFICE 2,475,357

ARGON - GAS - BLANKETED ALTERNATING ELECTRIC CURRENT ARC WELDING ALUMINUM AND THE ALLOYS THEREOF WITH A TUNGSTEN ELECTRODE AND SUPERIMPOSED HIGH-FREQUENCY HIGH-VOLTAGE ELECTRIC CURRENT

Wilber B. Miller, Great Neck, N. Y., assignor to The Linde Air Products Company, a corporation of Ohio Application December 23, 1944, Serial No. 569,588

1 Claim. (Cl. 219—10)

This invention relates to welding. It has for its principal object a method of welding ferrous and non-ferrous metals and alloys by the action of an electric arc struck between a metal electrode, substantially infusible under the welding conditions, and work to be welded, which arc during welding is enveloped by gas which is chemically inert with respect to the work and electrode.

Some metals and alloys enjoying wide commercial use are weldable only with considerable difficulty by conventional oxy-fuel gas or electric arc welding methods. Aluminum and its alloys and the highly alloyed stainless steels, particularly in the form of thin sheets, are examples of such materials. In arc welding thin sheets of stainless steel, for instance, great care must be exercised to avoid burning through the work. Although welds having adequate strength and ductility may be made in thin stainless steel sections by oxy-fuel gas welding, there is danger of causing deterioration of the corrosion resistance of the work at weld zones because of increase of carbon content. In welding aluminum by prior methods, either oxy-fuel gas or electric arc, care must be taken to avoid excessive oxidation of the work, and it is essential that a flux be employed. The flux used must be very carefully removed after welding else the corrosion resistance of the material will be seriously lessened.

In the past several years there has been developed a process of welding magnesium and magnesium-base alloys, in which process welding is conducted by the action of an electric arc struck between a tungsten electrode and work to be welded, and in which the arc is enveloped by a chemically inert monatomic gas such as helium or argon or a mixture of helium and argon. Because of the excellent quality and appearance of welds made by this process in thin sheets of magnesium and in magnesium-base alloys, attempts have been made to utilize it for welding other materials.

These attempts have generally not been commercially successful, particularly for stainless steel. For the electric welding of magnesium and its alloys by prior methods, direct current is used, and the electrode is made positive. For welding stainless steel, the use of direct current with a tungsten electrode and otherwise conventional procedure proved to be not at all satisfactory with the electrode either positive or negative. One of the chief difficulties encountered in attempts to weld stainless steel under these conditions is caused by the short arc that must be maintained. Spattering of molten metal from the work against the tungsten hot tip of the electrode causes contamination of the electrode, in turn causing a lowering of the melting point of the electrode. The contaminated portion of the electrode melts off into the weld and contaminates the metal at the weld. The short arc also makes it difficult to employ a metal filler rod without touching the hot tungsten electrode and contaminating it with such filler metal so as to cause the electrode to melt into the welding puddle. To avoid tungsten contamination of the weld, experiments have been made using a carbon electrode, but although physically satisfactory welds have been made with carbon electrodes, the chemical properties of the welds produced have been unsatisfactory because of carbon pick-up in the welds.

The present invention avoids the difficulties heretofore encountered in extending this welding process to use for welding materials other than magnesium and magnesium-base alloys. It comprises a method of arc welding in which either direct current or alternating current of a usual power-line frequency (e. g. 25–60 cycles) is employed for striking and sustaining an electric arc between a nonconsumed metal electrode and work to be welded while a high frequency, high voltage alternating current is continuously superimposed on the welding current and the electric arc, the arc at all times during welding being enveloped by gas which is chemically inert with respect to the work and electrode. In welding in accordance with the principles of the invention, a long arc may be maintained permitting the use of a filler rod when necessary without the danger of touching the filler rod to the hot end of the electrode, thus avoiding contamination of the electrode and the weld. Although the electrode is unconsumed in the sense that it is not employed as filler metal, it will, of course, in time be gradually used up by unavoidable accidental oxidation or overheating during use, but its life is considerably longer than when direct current alone is used for welding.

The single figure of the accompanying drawing illustrates diagrammatically a suitable electric circuit for use in the practice of the invention.

Referring to the drawing, in a typical application of the method of the invention, thin stainless steel plates 10, 11 to be welded may be supported by a backing plate 12. An electrode holder 13 having a refractory metal electrode 14, and an inert gas outlet 15 surrounding the electrode 14, is held in welding relationship with the plates 10, 11. Conductors 17, 18 are connected to the work and the electrode holder 13 respectively, for supplying welding current from a source 24 to the arc between the work and the electrode 14. A standard welding transformer having a primary coil and a secondary coil may be utilized for supplying welding current, the secondary coil being connected to the conductor 17. The output circuit of a source of high frequency, high voltage alternating current 21 is inductively coupled to the welding circuit by an inductive coupling having a primary coil 22 and a secondary coil 23. The secondary coil 23 is connected in series circuit relation with the welding circuit. The high frequency source 21 may be energized by a suitable alternating current.

In welding according to the method of the invention, work to be welded is suitably prepared and may or may not be supported by a backing member, depending on the characteristics of the metal to be welded. A filler rod may or may not be used, depending on the thickness of the material to be welded; very thin materials may be welded without the addition of filler metal, for example by preparing the edges to be united as illustrated in the drawing. Argon or helium or similar gas or mixtures of such gases is passed through the electrode holder 13, and the welding current is turned on and an arc struck between the electrode 14 and the work. At all times during welding, the high frequency current is superimposed on the welding current, for example, continuously during the progress of the welding along a seam between two plates to be welded.

The currents used for welding will depend in part on the thickness of the work to be welded as will the flow of gas and the speed of welding.

In general, welding currents, voltages, and frequencies utilized in the method of the invention are the normal currents, voltages, and frequencies (if alternating) used in ordinary arc welding. Ordinarily, welding currents of about 30 to 500 amperes at arc voltages of about 15 to 20 volts are used. The high frequency alternating current superimposed on the welding current may be supplied by any conventional high frequency source. The high frequency current should have a voltage of at least 2,000 volts, a very low amperage, generally less than one ampere, and a frequency of at least 1,000 cycles per second. Preferably, frequencies of at least 10,000 cycles per second are used.

The invention has been used successfully for welding stainless steels such as those of 18% chromium-8% nickel type, nickel-molybdenum alloys, copper-silicon alloys, brasses, and aluminum and aluminum-base alloys as well as magnesium and magnesium-base alloys. Welds of exceptional quality are readily produced in stainless steels, for example, using currents ranging between 50 and 200 amperes at welding voltages of about 15 to 18 volts in argon or helium atmospheres. Excellent welds are also produced in aluminum and aluminum alloys without flux in argon atmospheres.

An advantage of the method of the invention as compared to a process in which direct current alone is used is that the metal electrode is melted only superficially, if at all. The life of the electrode is accordingly very materially longer. Even more important, as already pointed out, contamination of the work with the metal of the electrode or of the hot end of the electrode by the filler rod or spatter from the molten puddle is negligible. These important advantages in inert-gas-blanketed arc welding are gained by continuously maintaining a longer arc gap between the work and the hot electrode tip while continuously superimposing a high-frequency high-voltage electric current upon the welding current during the progress of the welding along a seam. Such longer gap is one that is of greater length than the short gap required by the welding current alone to maintain a welding arc during the welding operation. Furthermore, by continually passing the high-frequency high-voltage current across such longer gap and superimposed upon the selected lower voltage welding current, the voltage of the gas-blanketed arc and consequently the power input at the welding point are substantially increased, so that a considerably higher welding speed (rate of advance of the welding electrode and the welding arc) is attained than is permissible when using the same welding current alone and the short arc gap required by the latter. Moreover, the superimposed high frequency current has the added functions and advantages of enabling successful arc welding with a relatively low and safe open circuit welding voltage and of suppressing rectification of the alternating welding current. Such rectification has been a very troublesome hindrance in efforts to use an alternating welding current alone for the inert-gas-blanketed arc welding of metals, especially aluminum and magnesium.

Although the method of the invention is particularly well suited for welding thin sheets, excellent welds may be produced in heavier sections. In welding heavy sections, the use of a filler material of substantially the same composition as the work being welded is desirable.

Although a tungsten electrode is preferred for the practice of the invention, a molybdenum electrode may be used. Generally the use of argon for enveloping the arc is preferred, but helium alone or in admixture with argon will give satisfactory results.

This application is a continuation-in-part of my application Serial No. 540,241, filed June 14, 1944 (now abandoned).

I claim:

In fluxless tungsten electrode argon gas shielded alternating current arc welding of corrosion resistant parts consisting of aluminum and the alloys thereof which is subject to undesirable contamination of the work due to the short arc which must be maintained between the electrode and the parts to produce a satisfactory weld, and rectification of the alternating current, the improved process which comprises juxtaposing the parts to be welded to provide a welding seam, positioning a bare tungsten electrode in spaced relation to the welding seam at the starting point to provide a welding arc gap, applying an alternating current potential of commercial power line frequency to establish an arc voltage of about 15 to 20 volts between the parts and said electrode, discharging a stream of argon gas from a nozzle surrounding said electrode toward such starting point on the work, applying an alternating potential of at least 2000 volts at a frequency of at least 1000 cycles between said electrode and the parts to discharge a high-frequency high-voltage current between said electrode and the parts which ionizes the welding arc gap and starts the alternating current welding operation under such stream of argon gas, and moving said electrode in the direction of the welding seam to progressively fuse together the parts under the argon gas stream along such seam while maintaining the flow of such argon gas stream and both of said alternating currents with the result that rectification of alternating welding current is continuously suppressed, the tungsten electrode is melted only superficially, and a welding arc of sufficient length is sustained to avoid any contamination of the weld which is uniformly sound and clean.

WILBER B. MILLER.

REFERENCES CITED

The following references are of record in the file of this patent:

UNITED STATES PATENTS

| Number    | Name         | Date          |
|-----------|--------------|---------------|
| 1,570,803 | Walker       | Jan. 26, 1926 |
| 1,746,081 | Hobart       | Feb. 4, 1930  |
| 1,746,191 | Devers       | Feb. 4, 1930  |
| 2,314,628 | Pavlecka     | Mar. 23, 1943 |
| 2,342,086 | Meredith     | Feb. 15, 1944 |
| 2,365,612 | White et al. | Dec. 19, 1944 |
| 2,399,377 | Pakala et al.| Apr. 30, 1946 |